(12) United States Patent
Morioka (10) Patent No.: US 12,290,056 B2
(45) Date of Patent: May 6, 2025

(54) REEL SEAT AND FISHING ROD (71) Applicant: GLOBERIDE, Inc., Tokyo (JP)

(72) Inventor: Toshiki Morioka, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 0 days.

(21) Appl. No.: 18/099,635

(22) Filed: Jan. 20, 2023

(65) Prior Publication Data
US 2023/0232801 A1 Jul. 27, 2023

(30) Foreign Application Priority Data
Jan. 27, 2022 (JP) ................... 2022-010980

(51) Int. Cl.
*A01K 87/06* (2006.01)
(52) U.S. Cl.
CPC .................... *A01K 87/06* (2013.01)
(58) Field of Classification Search
CPC ...................................... A01K 87/06
See application file for complete search history.

(56) References Cited

U.S. PATENT DOCUMENTS

| 2,862,852 | A | * | 12/1958 | Cannalonga | ........... | A61K 31/59 |
| | | | | | | 514/167 |
| 3,229,406 | A | * | 1/1966 | Binkley | ........... | A01K 87/06 |
| | | | | | | 43/18.1 R |
| 4,653,217 | A | * | 3/1987 | Ohmura | ........... | A01K 87/06 |
| | | | | | | 43/22 |
| 11,968,966 | B2 | * | 4/2024 | Akiba | ........... | A01K 87/08 |
| 2017/0112113 | A1 | | 4/2017 | Huang | | |
| 2022/0030842 | A1 | * | 2/2022 | Akiba | ........... | A01K 87/06 |

FOREIGN PATENT DOCUMENTS

| JP | 2006-333723 A | 12/2006 |
| JP | 2006-333726 A | 12/2006 |
| JP | 2017-018104 A | 1/2017 |
| JP | 2019-146536 A | 9/2019 |
| JP | 2020048451 A | 4/2020 |
| KR | 102150338 B1 | 9/2020 |

OTHER PUBLICATIONS

The Right and Wrong Way to Hold a Baitcaster, Apr. 15, 2017, https://www.lafishblog.com/how-i-hold-a-baitcaster/ (Year: 2017).*
Combined Search and Examination Report in connection with UK Patent Application No. 2300504.4; action dated Jun. 22, 2023; (6 pages).

(Continued)

*Primary Examiner* — Magdalena Topolski
(74) *Attorney, Agent, or Firm* — Oliff PLC (57) ABSTRACT

A reel seat for fixing a fishing reel comprises a tubular reel seat main body, a floating hood, and an operation knob. The tubular reel seat main body comprises a fixing hood and a hollow portion into which a rod is inserted. The floating hood is movable in an axial direction with respect to the reel seat main body. The operation knob rotates in a peripheral direction to move the floating hood in the axial direction. A finger hooking recess on which a finger of a user is disposed is provided in an upper portion on a front side of the floating hood.

5 Claims, 6 Drawing Sheets

(56) References Cited

OTHER PUBLICATIONS

Jan. 4, 2024 Office Action issued in British Patent Application No. GB2300504.4.
Jul. 12, 2024 Office Action issued in Austrailian Patent Application No. 2023200304.
Mar. 28, 2024 Office Action issued in Australian Patent Application No. 2023200304.
Oct. 15, 2024 Office Action issued in Japanese Patent Application No. 2022-010980.
Oct. 30, 2024 Office Action issued in Australian Patent Application No. 2023200304.
Jan. 20, 2025 Office Action issued in Australian Application No. 2023200304.
Mar. 4, 2025 Office Action issued in Japanese Application No. 2022-010980.

* cited by examiner

REEL SEAT AND FISHING ROD

CROSS-REFERENCE TO RELATED APPLICATION

This application claims priority under 35 U.S.C. § 119 to Japanese Patent Application No. 2022-010980 filed on Jan. 27, 2022 in the Japanese Patent Office, the entire contents of which is hereby incorporated by reference.

FIELD

The present disclosure relates to a reel seat for fixing a fishing reel and a fishing rod.

BACKGROUND

For example, JP 2020-48451 A discloses a reel seat for fixing a fishing reel. The reel seat includes a reel seat main body having a fixing hood, a floating hood (moving hood) movable in an axial direction with respect to the reel seat main body, and an operation knob that moves the floating hood. A mounting leg portion of the fishing reel is sandwiched or released by the fixing hood and the floating hood, whereby the fishing reel can be attached to or detached from a fishing rod.

SUMMARY

An upper portion of the floating hood (movable hood) and a grip provided on a front side of the floating hood are flush with each other such that a human's fingers can move smoothly. However, there is a problem that when the fishing reel and the reel seat are palmed and held while an index finger is brought into contact with the upper portion of the floating hood, the index finger slides, so that the fishing reel and the reel seat cannot be stably held.

The present disclosure has been made to solve the problem, and an object of the present disclosure is to provide a reel seat and a fishing rod that can be held stably while a finger is less likely to slip.

In order to solve the above problem, the present disclosure provides a reel seat for fixing a fishing reel, the reel seat comprising: a tubular reel seat main body comprising a fixing hood and a hollow portion into which a rod is inserted; a floating hood movable in an axial direction with respect to the reel seat main body; and an operation knob that rotates in a peripheral direction to move the floating hood in the axial direction, in which a finger hooking recess on which a finger of a user is disposed is provided in an upper portion on a front side of the floating hood.

According to the present disclosure, when the fishing reel and the reel seat are palmed, the index finger, for example, can be disposed in the finger hooking recess, so that the finger is less likely to slip and the fishing reel can be stably held.

In addition, a front inclined surface inclined forward and upward from a bottom portion and a rear inclined surface inclined rearward and upward from the bottom portion are preferably formed in the finger hooking recess along the peripheral direction.

According to the present disclosure, the finger can be easily disposed in the finger hooking recess.

In addition, it is preferable that a trigger that protrudes downward at a lower portion on a rear side of the reel seat and locks a finger is provided, and a rear constricted portion formed along the peripheral direction between the trigger and the fixing hood is provided at a lower portion and both side portions of the reel seat main body.

According to the present disclosure, when the fishing reel and the reel seat are palmed, for example, the ring finger can be disposed in the rear constricted portion, and the fishing reel and the reel seat can be stably held by the whole hand.

In addition, it is preferable to comprise a mounting seat on which a mounting leg portion of the fishing reel is disposed in an upper portion of the reel seat main body, cutout groove portions formed at corresponding positions of the mounting seat in both upper side portions of the reel seat main body, and a front constricted portion formed at corresponding positions of the cutout groove portions in a lower portion of the reel seat main body.

According to the present disclosure, when the fishing reel and the reel seat are palmed, for example, the tip of a middle finger can be locked to the cutout groove portion while the middle finger is along the front constricted portion, and the fishing reel and the reel seat can be stably held by the whole hand.

In addition, the present disclosure is a fishing rod comprising a rod, a reel seat, and a grip. The reel seat is inserted into the rod and attached to and detached from a fishing reel. The grip is connected to a rear end of the reel seat. The reel seat comprises a tubular reel seat main body, a floating hood, and an operation knob. The tubular reel seat main body comprises a fixing hood and a hollow portion into which the rod is inserted. The floating hood is movable in an axial direction with respect to the reel seat main body. The operation knob rotates in a peripheral direction to move the floating hood in the axial direction. The reel seat main body comprises a rear end large-diameter portion that expands in diameter toward a rear side at a rear end. The floating hood comprises a finger hooking recess on which a finger of a user is disposed at an upper portion on a front side. An outer peripheral surface of the rear end large-diameter portion and an outer peripheral surface of the grip are substantially flush with each other, and the outer peripheral surfaces of the rear end large-diameter portion and the grip have the same inclination angle.

According to the present disclosure, when the fishing reel and the reel seat are palmed, the index finger, for example, can be disposed in the finger hooking recess, so that the finger is less likely to slip and the fishing reel can be stably held. In addition, according to the present disclosure, the outer peripheral surface of the rear end large-diameter portion and the outer peripheral surface of the grip are substantially flush with each other, and the outer peripheral surfaces of the rear end large-diameter portion and the grip are inclined at the same angle, so that a feeling of gripping the whole including the grip can be improved.

According to the present disclosure, it is possible to provide a reel seat and a fishing rod that can be held stably while a finger is less likely to slip.

DETAILED DESCRIPTION

Hereinafter, a reel seat 3 and a fishing rod 1 according to an embodiment of the present disclosure will be described with reference to the drawings. In the embodiment, the same portions are denoted by the same reference signs, and redundant description will be omitted. Note that "up and down", "left and right", and "front and rear" follow arrows in FIGS. 1 and 2. A rod tip side is "front", and a rod base side is "rear".

Figure 1:
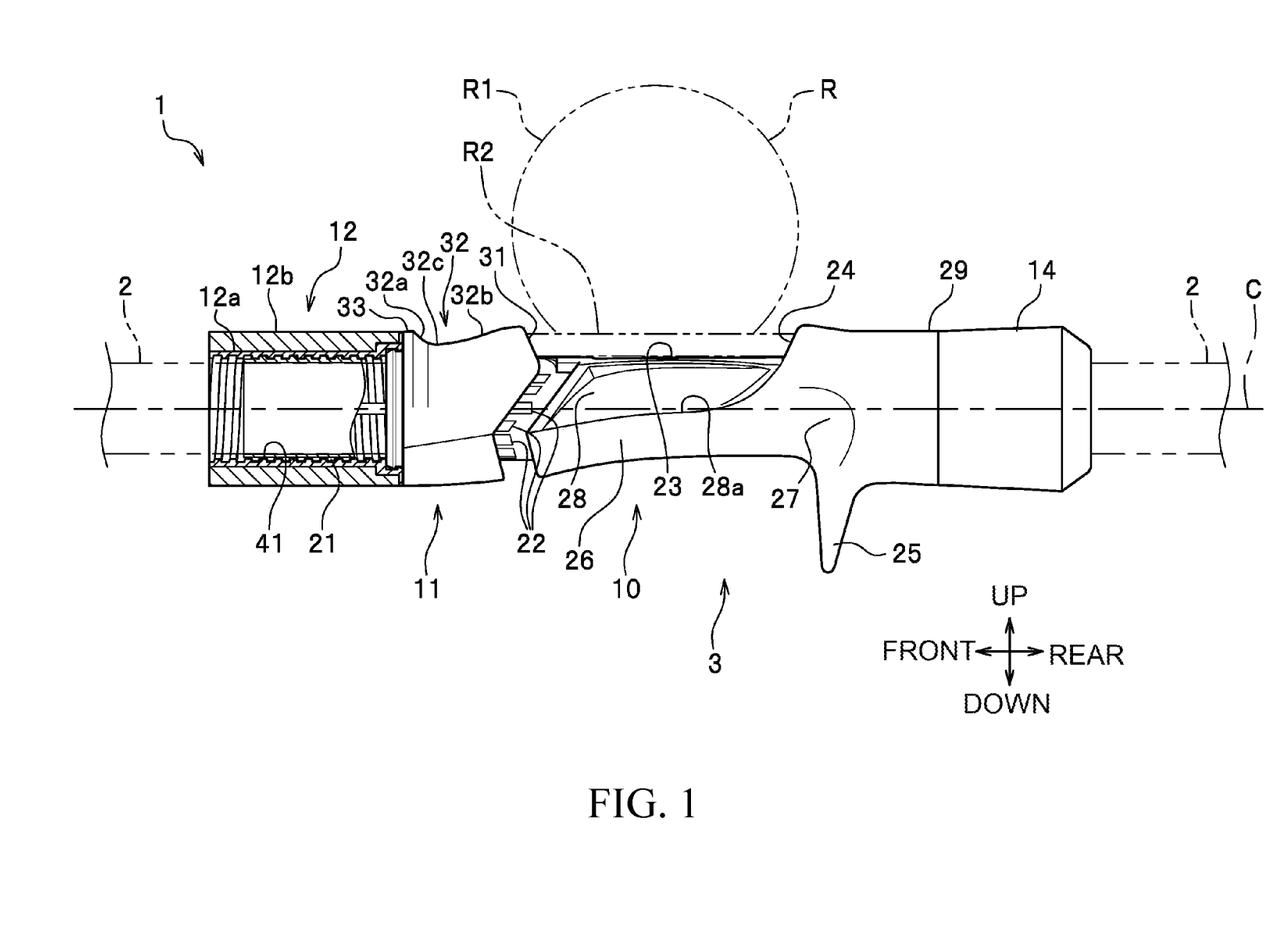
FIG. 1 is a side view illustrating a reel seat according to an embodiment of the present disclosure.

As illustrated in FIG. 1, the fishing rod 1 according to the present embodiment comprises a rod 2, the reel seat 3, and a rear grip 14. The reel seat 3 is a portion to and from which a fishing reel R is attached and detached. The fishing reel R is a double-shaft reel and comprises a reel main body R1, a mounting leg portion R2, and a handle R3 (see FIG. 4). The reel main body R1 has a circular shape in a side view. The mounting leg portion R2 is a plate-like portion formed in a lower portion of the reel main body R1 and extending a front-rear direction. The handle R3 is mounted to a right side portion or a left side portion of the reel main body R1 and is rotatable about an axis in a left-right direction. Note that the fishing reel R may be a bait reel. In addition, the reel main body R1 may also have another shape.

The reel seat 3 is a member to and from which the mounting leg portion R2 of the fishing reel R is attached and detached. The rod 2 is inserted into the reel seat 3 and fixed by adhesion. The reel seat 3 comprises a reel seat main body 10, a floating hood 11, and an operation knob 12.

The reel seat main body 10 has a tubular shape and comprises a hollow portion into which the rod 2 is inserted. The reel seat main body 10 comprises a male screw portion 21, a guide groove 22, a mounting seat 23, a fixing hood 24, a trigger 25, a front constricted portion 26, a rear constricted portion 27, and a rear end large-diameter portion 29.

Figure 2:
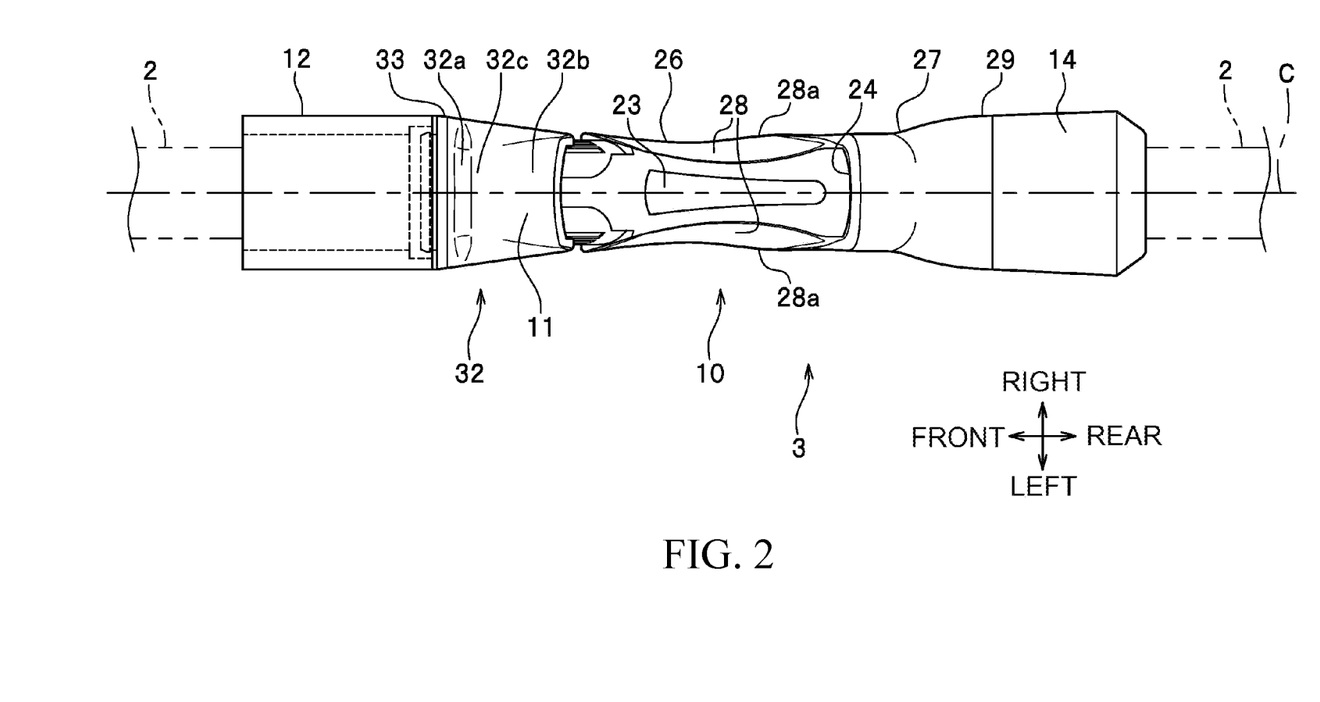
FIG. 2 is a top view illustrating the reel seat according to the present embodiment.

The male screw portion 21 is formed on an outer peripheral surface of a front end of the reel seat main body 10. The male screw portion 21 is a portion where the operation knob 12 rotates. A plurality of guide grooves 22 is formed along the front-rear direction on a rear side of the male screw portion 21. The guide groove 22 is a groove that guides the floating hood 11 in an axial direction. As illustrated in FIGS. 1 and 2, the mounting seat 23 is formed in a substantially flat shape along the front-rear direction in the upper portion of the reel seat main body 10. Cutout groove portions 28 and 28 are formed on both side portions of the mounting seat 23. The cutout groove portion 28 corresponds to the mounting seat 23 and is formed along the front-rear direction in an upper half of the reel seat main body 10.

The fixing hood 24 is a hollow portion formed in an upper portion on a rear side of the reel seat main body 10 and opened on the front side. The fixing hood 24 is a portion into which a rear portion of the mounting leg portion R2 is inserted. The trigger 25 is formed in a lower portion on the rear side of the reel seat main body 10 so as to protrude downward. The trigger 25 is a portion that locks a finger of a user.

Figure 3:
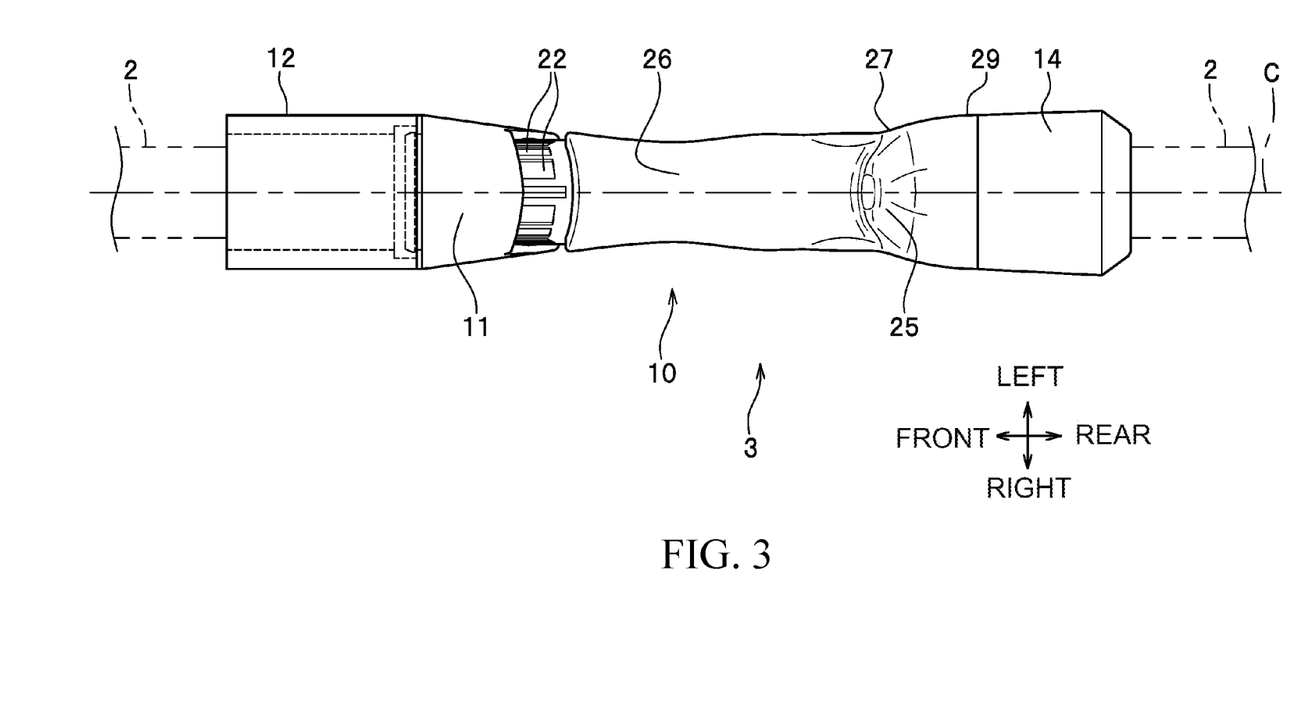
FIG. 3 is a bottom view illustrating the reel seat according to the present embodiment.

As illustrated in FIGS. 2 and 3, the front constricted portion 26 corresponds to the mounting seat 23 and the cutout groove portion 28 and is a portion recessed so as to reduce in diameter from a lower portion to both side portions of the reel seat main body 10. That is, the front constricted portion 26 is formed along a peripheral direction from the lower portion of the reel seat main body 10 to ridge lines 28a and 28a of cutout groove portions 28 and 28.

As illustrated in FIGS. 2 and 3, the rear constricted portion 27 is a portion recessed so as to reduce in diameter toward a lower portion and both side portions on the rear side of the reel seat main body 10. The rear constricted portion 27 is formed along the peripheral direction between the fixing hood 24 and the trigger 25.

The rear end large-diameter portion 29 is formed to have a larger diameter than diameters of other portions at a rear end of the reel seat main body 10. In addition, the rear end large-diameter portion 29 expands in diameter toward a rear side. The rear grip (grip) 14 is connected to a rear side of the rear end large-diameter portion 29. The rear grip 14 is formed of a flexible member such as cork or an ethylene vinyl acetate copolymer (EVA) of a foamable resin. The rear grip 14 may be formed of a hard resin. In addition, the rear grip 14 may be a middle grip or an end grip of the fishing rod 1. The rear grip 14 has a substantially columnar shape and expands in diameter toward the rear side. An outer peripheral surface of the rear end large-diameter portion 29 and an outer peripheral surface of the rear grip 14 are substantially flush with each other in the peripheral direction, and the outer peripheral surfaces of the rear end large-diameter portion 29 and the rear grip 14 have the same inclination angle.

As illustrated in FIG. 1, the floating hood 11 has a tubular shape and is loosely fitted in a portion corresponding to the guide groove 22 of the reel seat main body 10. The floating hood 11 comprises a hollow portion 31 and a finger hooking recess 32. A plurality of protrusions (not shown) that slides in the grooves of the guide grooves 22 is formed on an inner peripheral surface of the floating hood 11. The hollow portion 31 is opened on the rear side and is a portion into which a front portion of the mounting leg portion R2 is inserted between the hollow portion and the mounting seat 23.

The finger hooking recess 32 comprises a front inclined surface 32a, a rear inclined surface 32b, and a bottom portion 32c. The front inclined surface 32a is formed over the peripheral direction on a front upper side of the floating hood 11. The front inclined surface 32a is continuous with a front end 33 formed flat at a front end of the floating hood 11 and is inclined in a direction of an axis C as the front inclined surface 32a goes toward the rear side. In other words, the front inclined surface 32a is inclined toward an upper front side from the bottommost bottom portion 32c. The front inclined surface 32a is a flat surface in side view in the present embodiment, but may be a curved surface recessed toward the axis C.

The rear inclined surface 32b is continuous with the bottom portion 32c and extends toward the rear side. The rear inclined surface 32b is inclined in a direction away from the axis C as the rear inclined surface 32b goes toward the rear side. In other words, the rear inclined surface 32b is inclined toward a rear upper side from the bottom portion 32c. The rear inclined surface 32b is a flat surface in side view in the embodiment, but may be a curved surface recessed toward the axis C.

In side view of the floating hood 11, an inclination angle of the front inclined surface 32a with respect to the axis C and an inclination angle of the rear inclined surface 32b with respect to the axis C needs to be appropriately set, but in the present embodiment, the inclination angle of the front inclined surface 32a is larger than the inclination angle of the rear inclined surface 32b. In addition, when the floating hood 11 is viewed from the side, a depth (distance in an up-down direction) from the uppermost end of the rear inclined surface 32b to the bottom portion 32c needs to be appropriately set and is preferably, for example, 2.5 to 5.0 mm, and preferably 3.0 to 4.0 mm. As a result, a finger (for example, an index finger H2) can be stably disposed.

The operation knob 12 is connected to the front side of the floating hood 11 and has a tubular shape. The operation knob 12 is connected to the floating hood 11 so as to be relatively rotatable with respect to the floating hood 11. The operation knob 12 is a member that moves the floating hood 11 along the axial direction. Note that the operation knob 12 according to the present embodiment also has a grip function on a front side of the reel seat 3 (serves as an operation knob and a front grip).

The operation knob 12 comprises an inner cylinder portion 12a disposed inside and an outer cylinder portion 12b disposed outside. The inner cylinder portion 12a has a cylindrical shape and a female screw portion 41 screwed with the male screw portion 21 is formed on an inner peripheral surface.

The outer cylinder portion 12b has a cylindrical shape, is adhered to the outside of the inner cylinder portion 12a, and rotates in synchronization with the inner cylinder portion 12a. The outer cylinder portion 12b is formed of a flexible member, for example, cork or an EVA of a foamable resin or the like. The outer cylinder portion 12b may be formed of a hard resin. The outer diameter of the outer cylinder portion 12b needs to be appropriately set, but is substantially the same as the outer diameter of the front end 33 of the floating hood 11 in the present embodiment.

When the operation knob 12 is rotated in the peripheral direction, the operation knob 12 is axially moved while being rotated in the front-rear direction by a screwing engagement between the male screw portion 21 and the female screw portion 41, and the floating hood 11 follows the operation knob 12 to also move in the axial direction. A position of the floating hood 11 is moved in the front-rear direction with respect to the fixing hood 24, whereby the mounting leg portion R2 can be sandwiched or released.

Figure 4:
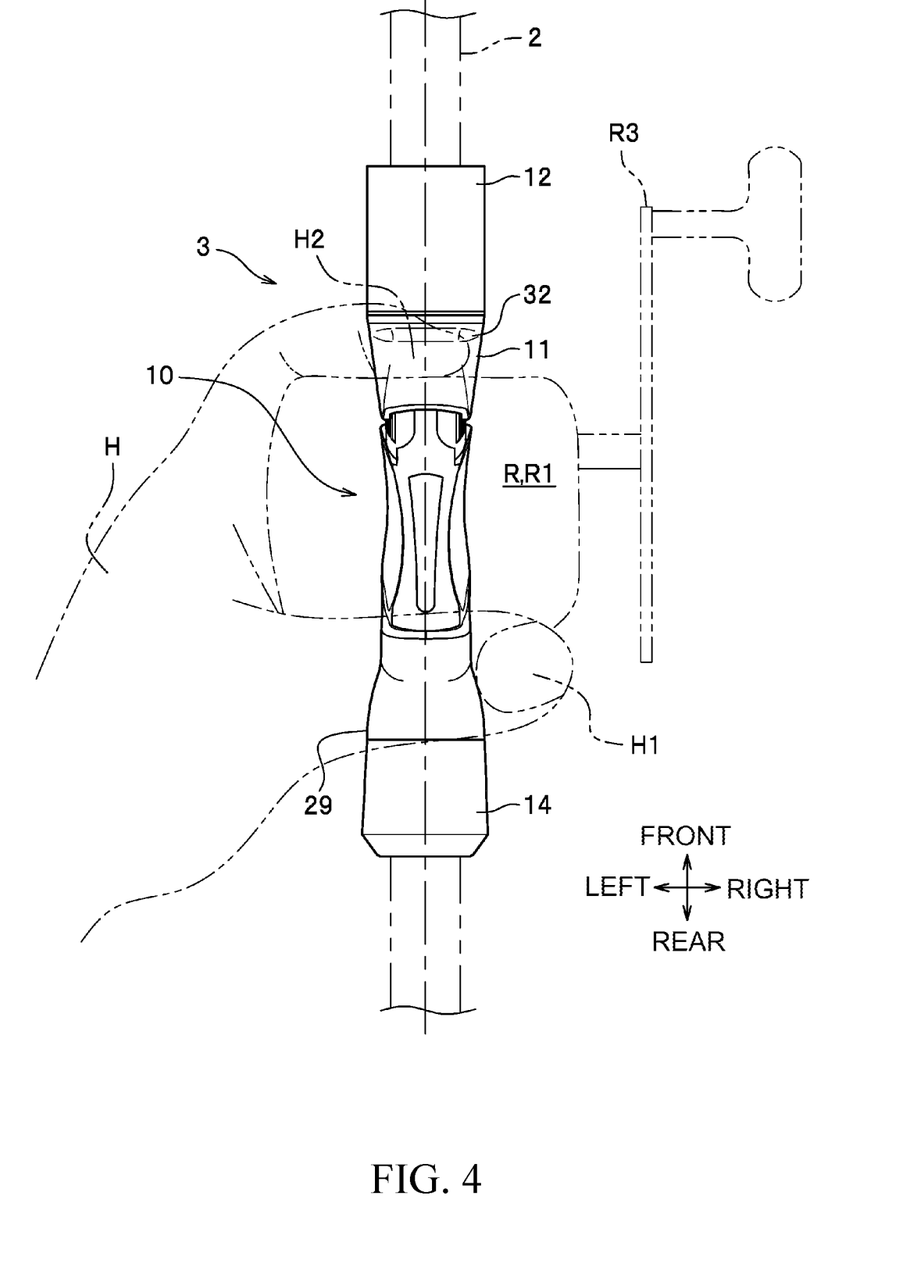
FIG. 4 is a top view illustrating a case where a fishing reel and the reel seat according to the present embodiment are palmed.
Figure 5:
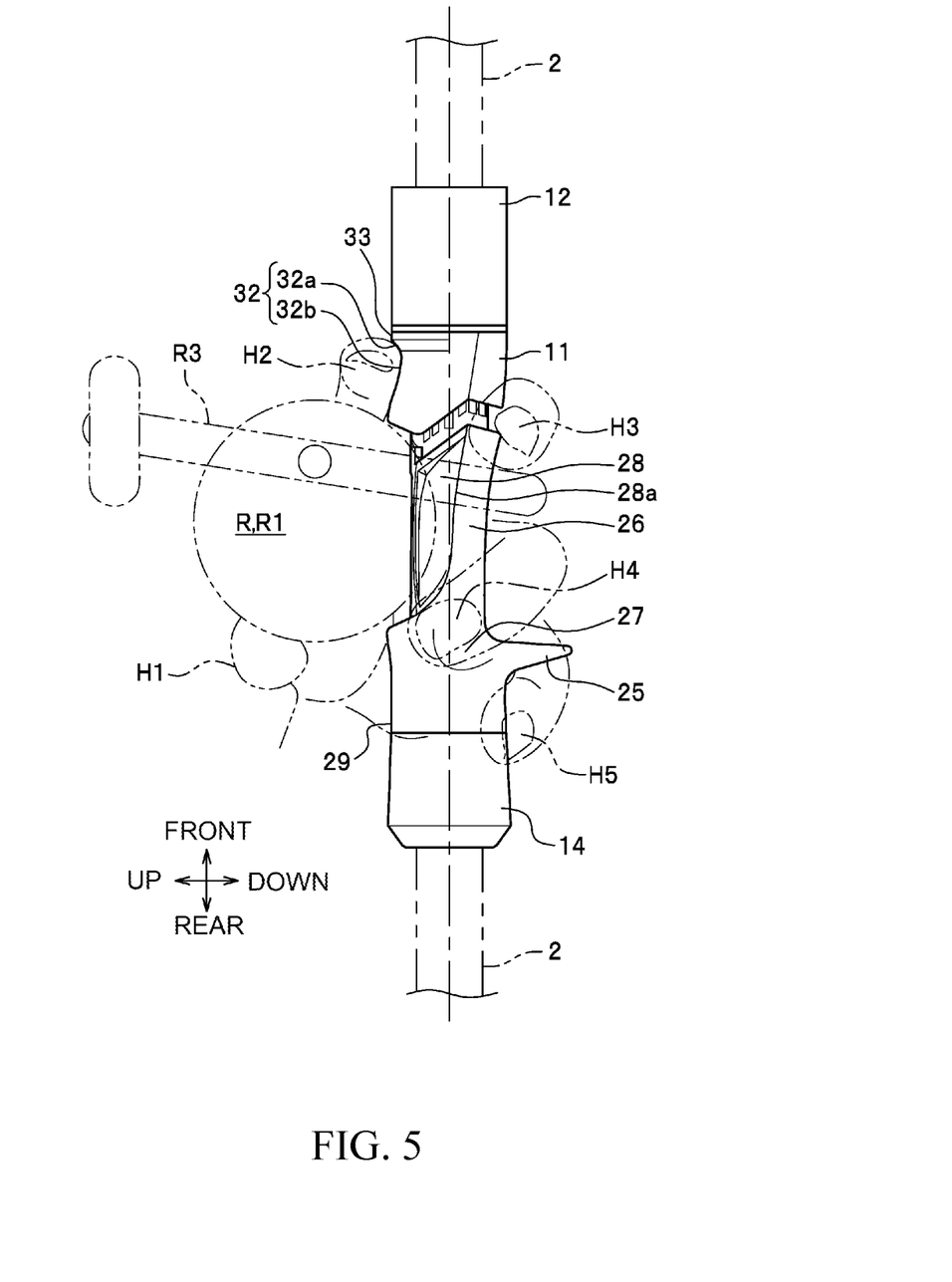
FIG. 5 is a side view illustrating a case where the fishing reel and the reel seat according to the present embodiment are palmed.

Next, a method of holding the fishing rod 1 and the fishing reel R according to the present embodiment will be described. FIGS. 4 and 5 illustrate a state in which the reel seat 3 and the fishing reel R are held by palming that is wrapping the reel seat 3 and the fishing reel R with a hand H of the user. Here, while the left side portion of the reel main body R1 is wrapped with the palm of the hand H, a thumb H1 is brought into contact with the rear portion of the reel main body R1, and the index finger H2 is brought into contact with the finger hooking recess 32. Furthermore, as shown in FIG. 5, a middle finger H3 of the hand H is brought into contact with a lower portion of a boundary portion between the reel seat main body 10 and the floating hood 11, a ring finger H4 is brought into contact with the rear constricted portion 27, and a little finger H5 is brought into contact with a lower portion of the rear end large-diameter portion 29.

More specifically, a side portion of the index finger H2 abuts on the finger hooking recess 32, an antinode of the ring finger H4 is brought into contact with the rear constricted portion 27, and the trigger 25 is sandwiched between the ring finger H4 and the little finger H5. In addition, an antinode of the little finger H5 is brought into contact with a lower portion of a boundary portion between the rear end large-diameter portion 29 and the rear grip 14.

According to the fishing rod 1 and the reel seat 3 according to the present embodiment described above, when the reel seat 3 and the fishing reel R are palmed, for example, the index finger H2 can be disposed in the finger hooking recess 32, so that the index finger H2 is less likely to slip, and the reel seat 3 and the fishing reel R can be stably held. In addition, in the present embodiment, when the thumb H1 is brought into contact with the rear portion of the reel main body R1 and the index finger H2 is positioned on a front side of the reel main body R1, the side portion of the index finger H2 can be naturally brought into contact with the finger hooking recess 32.

In addition, the finger hooking recess 32 comprises the front inclined surface 32a, and the front inclined surface 32a restricts a forward movement of the index finger H2. In addition, the finger hooking recess 32 comprises the rear inclined surface 32b, and the rear inclined surface 32b restricts a rearward movement of the index finger H2. As a result, the index finger H2 can be stably disposed in the finger hooking recess 32.

In addition, the rear constricted portion 27 is provided, whereby the antinode of the ring finger H4 can be brought into contact with the rear constricted portion 27. As a result, the index finger H2 fits into the finger hooking recess 32, and the ring finger H4 also fits into the rear constricted portion 27, so that the reel seat 3 and the fishing reel R can be stably held with the whole hand H. Furthermore, the trigger 25 is sandwiched by the ring finger H4 and the little finger H5, whereby force does not escape and the trigger 25 can be strongly gripped.

In addition, the rear end large-diameter portion 29 having a diameter that increases toward the rear side is formed at the rear end of the reel seat main body 10. A rear grip 14 connected to the rear end large-diameter portion 29 is provided. The outer peripheral surface of the rear end large-diameter portion 29 and the outer peripheral surface of the rear grip 14 are substantially flush with each other, and the outer peripheral surfaces of the rear end large-diameter portion 29 and the rear grip 14 have the same inclination angle. As a result, a feeling of gripping the whole including the rear grip 14 can be further improved. More specifically, the diameter is reduced at the rear constricted portion 27 and gradually increased at the rear end large-diameter portion 29 and the rear grip 14, whereby force is easily applied from the rear side to a front side, play of each finger is reduced, and the feeling of gripping the whole including the rear grip 14 can be further improved.

Note that the position of each finger of the hand H described above is merely an example, and can be appropriately changed according to the preference of the user and the size of the hand H. For example, the middle finger H3 in FIG. 5 can also be hooked on the ridge line 28a of the cutout groove portion 28. In addition, at this time, the middle finger H3 is easily hooked on the ridge line 28a since the front constricted portion 26 is provided. Even in such a form, the fitting of the middle finger H3 is improved, and the reel seat 3 and the fishing reel R can be stably held.

Figure 6:
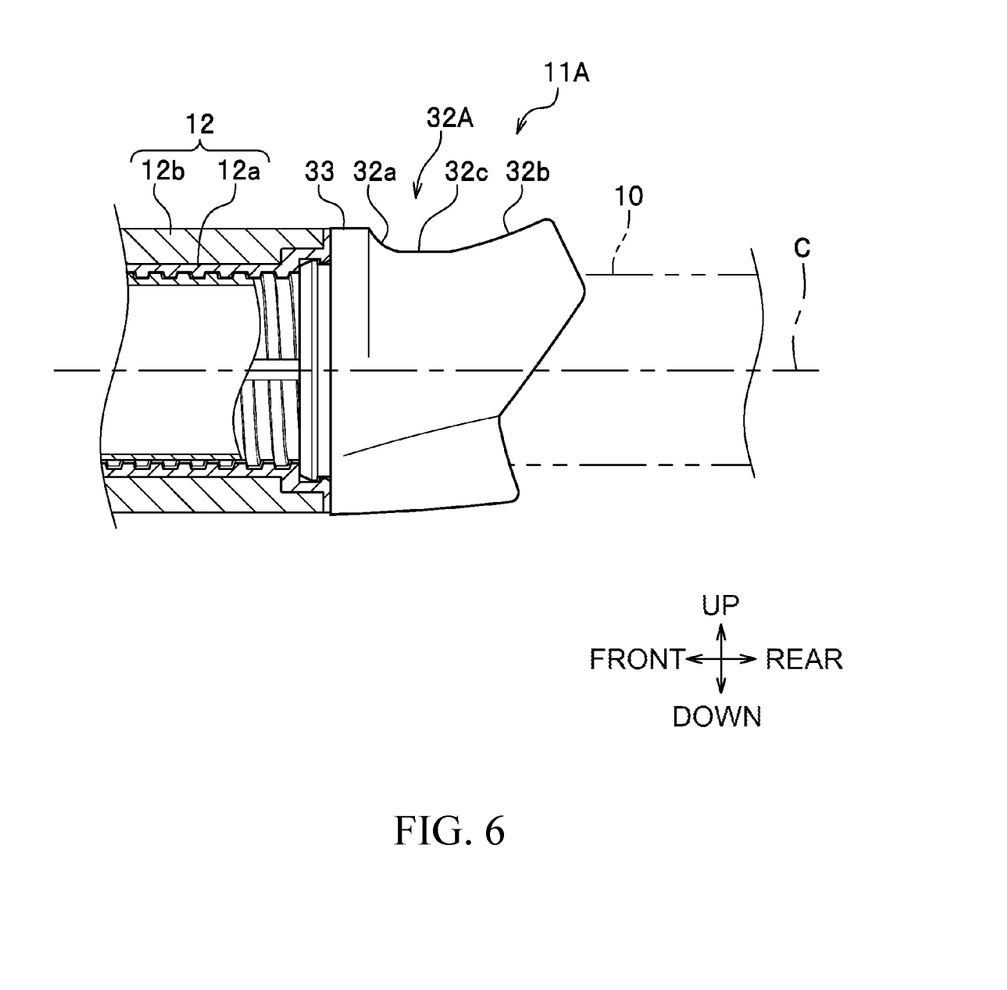
FIG. 6 is a side view illustrating a floating hood according to a modification.

FIG. 6 is a side view illustrating a floating hood 11A according to a modification. As illustrated in FIG. 6, the floating hood 11A according to the modification comprises a finger hooking recess 32A. The finger hooking recess 32A comprises a front inclined surface 32a, a rear inclined surface 32b, and a bottom portion 32c. The front inclined surface 32a is formed of a curved surface recessed toward an axis C. The front inclined surface 32a is formed along a peripheral direction on an upper side. The bottom portion 32c is formed between the front inclined surface 32a and the rear inclined surface 32b. The bottom portion 32c is a flat surface in side view and is substantially parallel to the axis C. In addition, the lowermost point (bottommost point) of the finger hooking recess 32A is set on a rear side as compared with the above-described embodiment. In addition, the length of a front end 33 in an axial direction is also set to be longer than that of the above-described embodiment. The finger hooking recess 32A is provided with the bottom portion 32c that is a flat surface in side view, whereby it is possible to improve the fitting of a finger. In this manner, the shape of the finger hooking recess 32A needs to be appropriately set so that the finger to be brought into contact restricts a movement in the front-rear direction.

In addition, for example, the rear end large-diameter portion 29 and the rear grip 14 may not be increased in diameter and may have the same diameter.

REFERENCE SIGNS LIST

1 Fishing rod
2 Rod
3 Reel seat
10 Reel seat main body
11 Floating hood
12 Operation nob
14 Rear grip (grip)
23 Mounting seat
24 Fixing hood
25 Trigger
26 Front constricted portion
27 Rear constricted portion
28 Cutout groove portion
29 Rear end large-diameter portion
32 Finger hooking recess
32a Front inclined surface
32b Rear inclined surface
32c Bottom
R Fishing reel
R1 Reel main body
R2 Mounting leg portion
R3 Handle

What is claimed is:

1. A reel seat for fixing a fishing reel, the reel seat comprising:
a tubular reel seat main body comprising a fixing hood and a hollow portion into which a rod is configured to be inserted;
a floating hood movable in an axial direction with respect to the reel seat main body; and
an operation knob that rotates in a peripheral direction to move the floating hood in the axial direction, wherein
a finger hooking recess configured to support an index finger of a user is in an upper portion on a front side of the floating hood, the finger hooking recess having a depth of 2.5 mm to 5.0 mm from an uppermost end of a rear surface of the finger hook recess.

2. The reel seat according to claim 1, wherein a front inclined surface inclined forward and upward from a bottom portion and a rear inclined surface inclined rearward and upward from the bottom portion are formed in the finger hooking recess along the peripheral direction.

3. The reel seat according to claim 1, further comprising:
a trigger that protrudes downward at a lower portion on a rear side of the reel seat and is configured to lock a finger; and
a rear constricted portion formed along a peripheral direction between the trigger and the fixing hood at a lower portion and both side portions of the reel seat main body.

4. The reel seat according to claim 1, further comprising:
a mounting seat, on which a mounting leg portion of the fishing reel is configured to be disposed, in an upper portion of the reel seat main body;
a cutout groove portion formed at each of corresponding positions of the mounting seat in both upper side portions of the reel seat main body; and
a front constricted portion formed at a corresponding position of the cutout groove portion in a lower portion of the reel seat main body.

5. A fishing rod comprising: a rod; a reel seat that is inserted into the rod and attached to and detached from a fishing reel; and a grip connected to a rear end of the reel seat, wherein
the reel seat comprises:
a tubular reel seat main body comprising a fixing hood and a hollow portion into which the rod is inserted;
a floating hood movable in an axial direction with respect to the reel seat main body; and
an operation knob that rotates in a circumferential direction to move the floating hood in an axial direction,
the reel seat main body comprises a rear end large-diameter portion that expands in diameter toward a rear side at a rear end,
a finger hooking recess configured to support an index finger of a user is at an upper portion on a front side of the floating hood, the finger hooking recess having a depth of 2.5 mm to 5.0 mm from an uppermost end of a rear surface of the finger hook recess, and
an outer peripheral surface of the rear end large-diameter portion and an outer peripheral surface of the grip are substantially flush with each other, and the outer peripheral surfaces of the rear end large-diameter portion and the grip have the same inclination angle.

* * * * *